March 1, 1938.  C. V. BATES  2,109,953

RECIPROCATING MOTOR

Filed April 24, 1934  2 Sheets-Sheet 1

Inventor,
Clifford V. Bates,
Atty.

Witness:

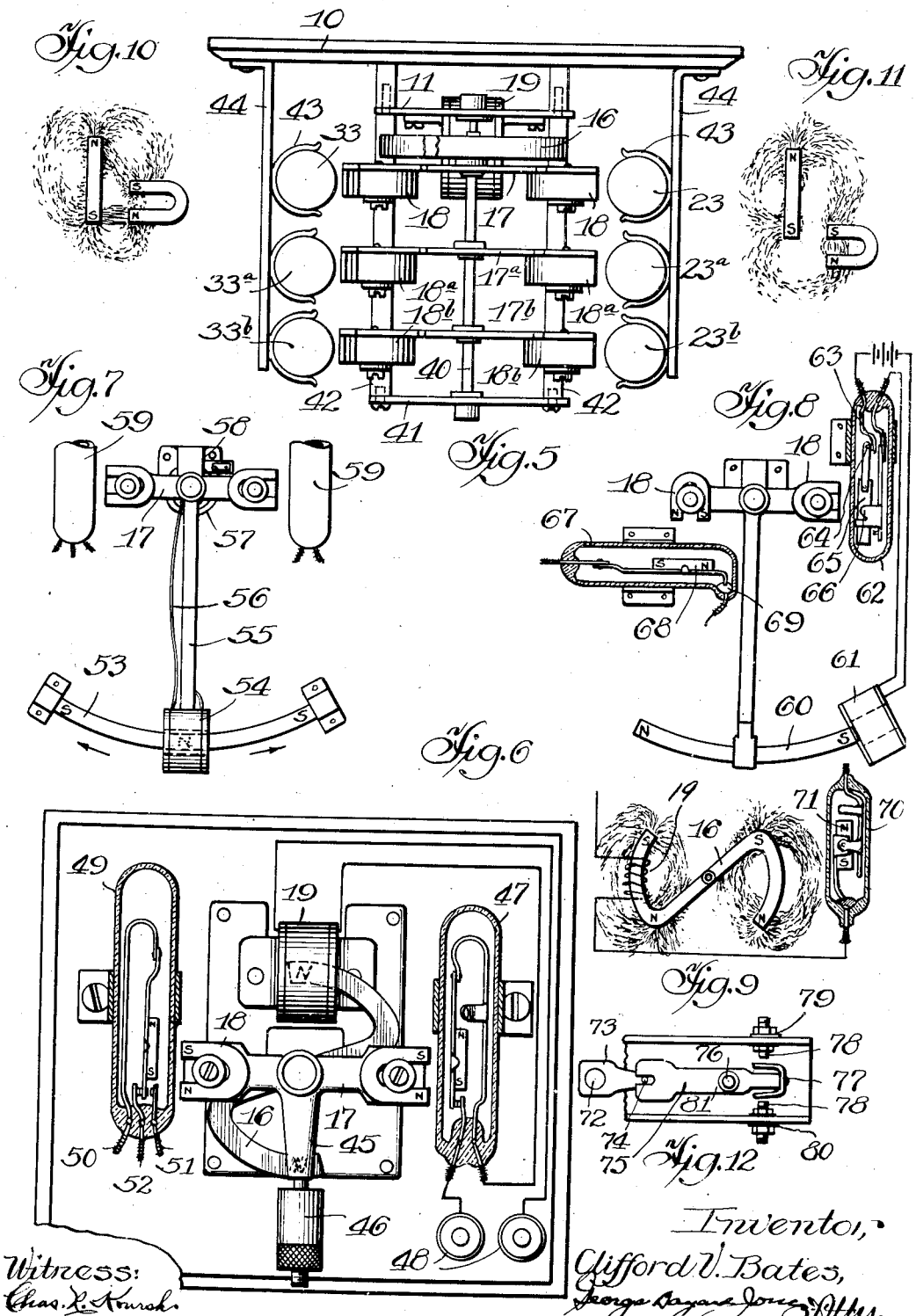

Patented Mar. 1, 1938

2,109,953

UNITED STATES PATENT OFFICE 2,109,953

RECIPROCATING MOTOR

Clifford V. Bates, Chicago, Ill.

Application April 24, 1934, Serial No. 722,159

12 Claims. (Cl. 172—126)

This invention relates to improvements in reciprocating motors and more particularly to devices used to operate flashers or warning traffic signals, although not limited to such use.

One object of the invention is to provide an improved oscillating device for opening and closing a circuit at regular intervals, wherein the oscillations are maintained by a very small current.

Another object is to provide, in a device of this character, an oscillating permanent magnet of S shape.

Another object is to provide an improved relay for operating a number of circuits, by means of a very small current.

Another object is to provide a relay with an oscillating member carrying a small polarized magnet which attracts and repels a second polarized magnet to open and closed circuit contacts in a sealed container.

An additional object is to provide a relay equipped with an oscillating support carrying a small horseshoe magnet which actuates a second magnet in a sealed container for the purpose of opening and closing circuit contacts therein.

A further object is to provide a relay capable of controlling circuits of comparatively high voltage, by means of a coil energized by a current of low voltage or small current.

Other objects and advantages will be apparent from the more detailed description hereinafter presented.

In the accompanying drawings I have illustrated several embodiments of the invention.

Fig. 5 is a top plan view of a modified form of device;

Fig. 6 is a front elevation of a further modification;

Figs. 7, 8, and 9 are further modifications in somewhat diagrammatic form;

Figs. 10 and 11 illustrate the magnetic circuit of certain of the magnets; and

Fig. 12 is a partial elevation of an additional modification.

Figure 1:
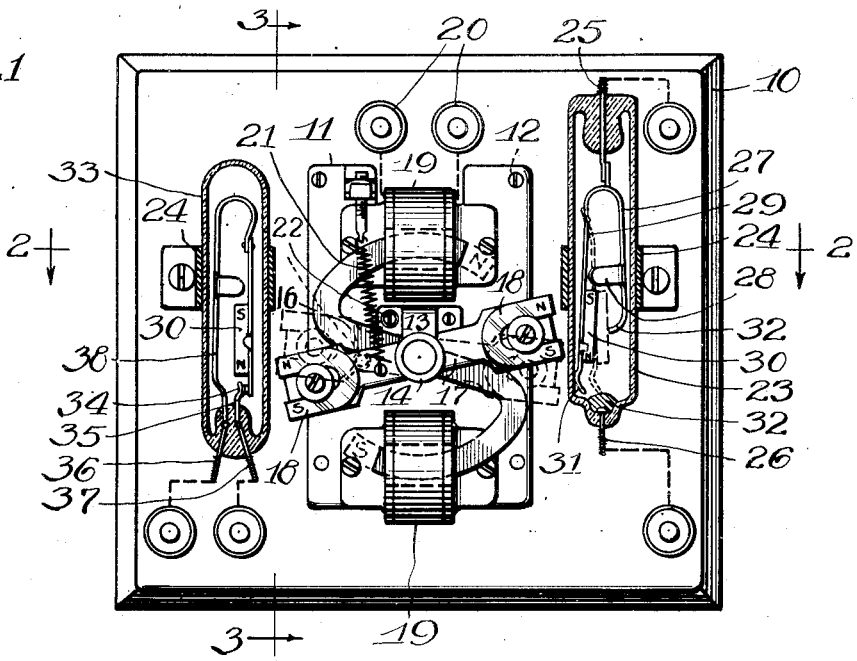
Fig. 1 is a front elevation of a relay.

Referring to Fig. 1, a suitable insulating base 10 is provided having a supporting plate 11 spaced therefrom by short posts 12. Said plate has a U shaped bracket 13 thereon with bearings 14, 14 at opposite ends in which a shaft 15 is pivotally mounted. Said shaft has a permanent magnet 16 fixed thereon, said magnet being preferably S shaped with its opposite ends constituting opposite poles and with two intervening poles as marked thereon in Fig. 4. The lines of force in the vicinity of such a magnet are illustrated approximately in Fig. 9, which is a representation of the position assumed by iron filings when dropped onto a sheet of paper laid over the magnet and agitated slightly. Said pivotal shaft 15 also has a transverse arm 17 thereon made preferably of non-magnetic material such as brass and carrying at one or both ends a small magnet which may be of horseshoe shape such as those shown at 18, 18.

In operation, the horseshoe magnet oscillates about its pivotal support and for this purpose one or more coils 19 are provided at one or both ends through which the arc-shaped ends of the magnet may move back and forth without touching the same, as indicated in dotted lines in Fig. 1. These electro-magnetic windings are connected to suitable binding posts 20, preferably in parallel and when supplied with an intermittent current from any suitable source, the magnet moves from its initial or dotted line position to that shown in full lines, against the action of the adjustable spring 21. When the current is cut off said spring restores said magnet and associated parts to initial position. The limit of movement is determined by stops 22, 22.

Figure 2:
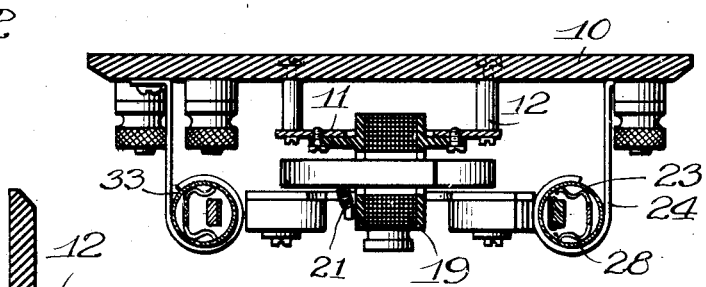
Fig. 2 is a section thereof on the line 2—2 of Fig. 1.
Figure 3:
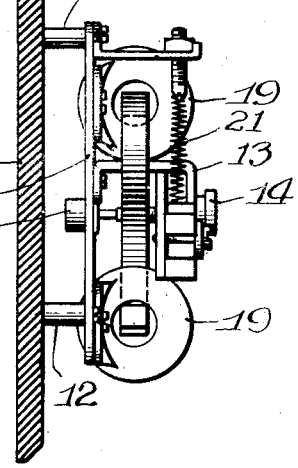
Fig. 3 is a section on the line 3—3 of Fig. 1.

The oscillating movement of the right hand horseshoe magnet 18 as viewed in Fig. 1 is used to open and close an independent circuit whereby the device operates as a relay. A glass tube 23 is suitably mounted adjacent the path of movement of said U shaped magnet and preferably in vertical position, as shown in Fig. 1, being held by a suitable clip 24. Said tube has upper and lower sealed-in terminals 25 and 26 respectively, the air being exhausted from said tube so as to prolong the life of the contacts therein. A formed strip of metal 27 is connected to the lower end of the upper terminal or leading-in wire 25 and is provided with curved transverse arms 28 as shown in Fig. 2, which yieldingly press against the glass and confine the device within the tube. A small resilient strip of metal 29 depends from the upper end of the strip 27 and carries a small permanent magnet 30 and also has a suitable contact 31 at its lower end which dips into a globule of mercury 32, the latter being in contact with the lower leading-in wire 26. With the construction described it will be seen that the small polarized magnet is free to swing back and forth under the influence of the horseshoe magnet 18 as the latter is moved up and down and thereby open and close the circuit through the tube 23. In the position shown in Fig. 1, said horseshoe magnet is in uppermost position, in which its lower pole is adjacent the lower pole of the magnet 30, whereby the two attract each other, being of unlike polarity. In this position the circuit is open. When said horseshoe magnet moves downwardly, its upper pole is adjacent the lower and like pole of the enclosed magnet whereby the latter is repelled and closes the circuit, the limit of movement being determined by a stop 32. The contacts are preserved against deterioration, being in a sealed tube and they move under the comparatively slight influence of the small polarized magnets, affording a very reliable means of operation. Also, the current carried by the contacts in the sealed containers may be of considerable volume whereas the current necessary to operate the coil or coils 19 of the relay may be very slight, in fact only a small fraction of the current flowing in the other circuit.

As shown at the left hand side of Fig. 1, another circuit may be controlled, similar to that just described. This is accomplished merely by mounting another tube 33, with corresponding enclosed contacts, on the supporting base and within the sphere of influence of the left hand horseshoe magnet 18. The contacts therein may be identical with those shown in the tube 23, but for the purpose of showing a modification they both consist of solid contacts 34, 35, of suitable non-arcing material instead of using mercury for one of the contacts. These contacts 34 and 35 are connected with terminals 36, 37 in the same end, i. e. the bottom of the tube instead of in the opposite ends thereof. The supporting frame 38 is somewhat similar to the one previously described except it is supported at the bottom and the polarized magnet depends in the same manner as that previously described.

The two circuits controlled by the contacts in the two tubes may be flasher circuits such as are used in connection with automobile traffic, at railroad crossings and other purposes as will be evident. When the circuit through the right hand tube, as viewed in Fig. 1, is open, the circuit through the left hand tube is closed and vice versa. Thus the device lends itself to use in connection with two adjacent flashers which flash alternately as well as to use with flashers or signals which are widely separated. Also, the contacts may be so arranged that the two circuits open and close concurrently instead of alternately. Furthermore, one of the tubes as for example the right hand one, may be connected to the terminals 20 of the coils 19, with a small battery in circuit therewith whereby the oscillating magnet keeps up a constant oscillation, under the control of the contacts in the right hand tube, or, preferably, in order to utilize the mercury contact for an external circuit, the left hand tube contacts may constitute the local circuit, by turning the left hand horseshoe magnet to reverse its poles with respect to those of the polarized bar magnet within the tube, i. e. to bring unlike poles opposite each other when the parts are in initial position.

Where one or the other of the tubes is omitted, as for example the left hand tube, leaving only the right hand tube to control an external circuit, the left hand horseshoe magnet serves merely as an adjustable weight tending to keep the S shaped magnet in the full line position against one of the stops 22, in opposition to the action of the spring. In other words it acts as a pendulum in keeping up the oscillations as long as one or both of the coils 19 continue to be energized at regular intervals. Under such conditions the spring may be omitted, and also the horseshoe shaped weight may be replaced by any adjustably mounted weight, by means of which the S shaped magnet assumes the full line position when the current to the binding posts 20 is cut off. In this position the external circuit is open at the mercury contact but the closing and opening of the external circuit begins as soon as intermittent current is supplied to said binding posts.

The number of external circuits controlled by the relay may be increased within wide limits, by increasing the number of cross arms or equivalent supporting means on the shaft. Such an arrangement is shown in Fig. 5 in which some of the same reference characters previously referred to are used to indicate corresponding parts. The S shaped magnet 16 is on a longer supporting shaft 40 the outer end of which is journalled in a cross plate 41 supported by brackets 42. The cross arms 17, 17a, 17b are mounted on the shaft 40 and carry the small horseshoe magnets 18, 18a, 18b in the same manner as in the device of Fig. 1. The tubes 23, 23a, 23b and 33, 33a and 33b are supported in clips 43 carried by brackets 44 mounted on the base. The number of units which make up the device may be greatly extended, as will be apparent, and thus a large number of circuits may be opened and closed periodically by a single actuating unit.

Fig. 6 shows a further modification of what may be called a pendulum form wherein an additional adjustable weight is used, instead of a spring. The cross arm 17 has a stem 45 depending from it vertically with an adjustable weight 46 carried thereby, thus permitting regulation of the timing of the oscillations. The right hand tube 47 may be the same construction as the tube 33 in Fig. 1 and is connected to the binding posts 48 and to the electromagnetic winding 19 of which only one is employed in this instance. By connecting said binding post to a battery, the contacts in the tube 47, which are normally in contact, close the circuit to the winding 19, permitting the energization of the same and thus causing the device to begin its oscillations. The initial movement of the right hand horseshoe magnet is upwardly, thereby opening the circuit and permitting the pendulum to swing in the opposite direction, resulting in closing the circuit, and so on. A vertical plane through the middle of the winding 19 intersects the arc-shaped end of said magnet between its extremities. The magnet is shown as having its upper end projecting through but not beyond said winding, although it may project farther, as in Fig. 1 for example. In Fig. 6 it is shown in its mid-position or position of rest. The contacts in the left hand tube 49 are shown as controlling two external circuits in this case as represented by terminals 50, 51 and terminal 52, common to both circuits. Two flashers may be operated by said contacts or any other circuits may be alternately opened and closed thereby. It will be understood of course that the coil 19 may be supplied with intermittent current from an external source, if desired, and both tubes used to control an external circuit or circuits.

In Fig. 7 the S shaped magnet is omitted and is replaced by an arc shaped magnet 53 which is fixed in position and over which swings the electromagnetic winding or coil 54 which maintains the oscillations. This coil has one terminal connected, as by a wire, to the pendulum 55, the other terminal being connected by a wire 56 to a hair spring 57 mounted at one end on but insulated from, the bracket 58. Thus the coil may be connected to an external circuit or to the terminals of one of the two tubes 59, 59, which tubes may be similar to those previously described.

In the modification shown in Fig. 8, the relative mounting of the arc shaped magnet and the actuating coil is reversed, the magnet 60 being mounted at the lower end of the pendulum and being arranged to swing through the opening in the fixed coil 61 to maintain the oscillations. Said coil is connected with the tube 62, with a battery in circuit, said tube containing contacts 63, 64, actuated by a permanent magnet 65, which in this instance is shown pivotally mounted at 66 instead of being mounted to swing bodily back and forth through a small arc as in the previously described forms. The up and down oscillations of the horseshoe magnet 18 serve to rock the polarized magnet 65 about its support with a definite positive movement which is advantageous, particularly as the circuit in the tube is opened. The left hand tube may be similar to any of those previously described and may be mounted in a similar manner but is, however, shown mounted in horizontal position as illustrating another arrangement which may be employed also in connection with some of the other forms of the invention described. The horseshoe magnet 18 on the left hand end of the arm 17 moves up and down, thus approaching and receding from the tube 67, thereby raising the polarized magnet 68 intermittently and allowing it to fall back to close the circuit through the mercury contact 69.

Fig. 9 is intended primarily to show the magnetic field surrounding the S shaped magnet which is used in several of the forms of the invention previously described, particularly at the ends thereof. The opposite ends of said magnet 16 are of unlike polarity and each arc shaped end span has a north pole at one end and a south pole at the other, as in Figs. 1 and 4. In Fig. 9 said S shaped magnet is shown pivotally mounted as in certain other figures, and may be controlled by a coil 19 similar to those previously described. The magnet is positioned horizontally and one end of it actuates the contacts within the tube 70, said contacts including a mercury contact as in some of the forms previously described. The polarized bar magnet 71 is pivotally mounted, near its center, whereby it ocillates to open and close the circuit as the adjacent end of the S shaped magnet moves up and down. The tube itself is vertical in view of the mercury in the bottom of it although of course it might be horizontal as in Fig. 8 if it were suitably shaped to retain the mercury, in which case the S shaped magnet could be vertically arranged. In practice the tube is close to the magnet.

Figs. 10 and 11 illustrate the field developed by the polarized bar magnet and the small horseshoe magnet when the latter moves up and down as in several of the previously described forms of the invention. Fig. 10 shows the field developed when the horseshoe magnet is in uppermost position, wherein the bar magnet and particularly the lower end thereof is attracted by the lower arm of the horseshoe magnet. In Fig. 11 the horseshoe magnet is moved downwardly, the relationship being such that the lower end of the polarized bar magnet is repelled. These diagrams show that only a comparatively slight relative vertical movement of the two magnets will cause the necessary lateral movement of the bar magnet.

As thus far described, the moving parts move from one to the other of the two extreme positions, having no neutral position or dead center. However, the S shaped magnet in the relay shown in Fig. 1 may be held in neutral position by reversing the terminal connections of one of the two coils 19, whereby said coils oppose each other when energized and will hold the S shaped magnet in neutral position when both of them are energized. In this way contacts may be provided, which, under the influence of the small horseshoe magnet will remain in neutral position as long as the S shaped magnet is in neutral position but when one of the coils 19 is deenergized the other coil will cause the oscillations of said magnet to begin, thereby alternately opening and closing either of two circuits or controlling a single circuit, as may be desired.

Figure 4:
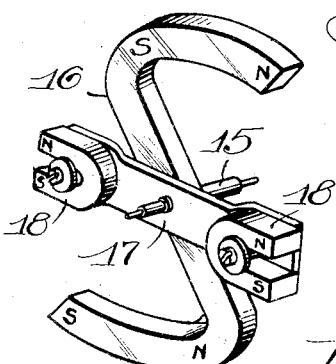
Fig. 4 is a perspective view of the S shaped magnet.

Although the S shaped magnet shown in Fig. 4 has unlike poles at opposite ends, it may have like poles at said ends and an intermediate opposite pole, where used in conjunction with the cooperating parts shown in Fig. 1, for example, and in some of the other figures. In Fig. 9, however, four poles are required when only a short oscillating movement of the S shaped magnet is desired, as will be evident. In fact, in the several forms of the invention where an S shaped magnet is shown, a four pole arrangement is preferable to two poles, except in Fig. 6 where only one end of the magnet is influenced by the single coil 19. The devices, particularly of the type shown in Fig. 1, are operative however merely with two unlike end poles and no intermediate pole or poles.

Fig. 12 illustrates the manner in which the oscillating S shaped magnet may directly and mechanically control the operation of the exposed contacts as distinguished from contacts sealed in a tube and magnetically controlled. The shaft 72 in Fig. 12 corresponds in general to the shaft 15 in the device of Fig. 1 and has the S shaped magnet mounted on it and also an oscillating arm 73 having a pin 74 engaged in a slot in the end of a longer pivoted arm 75. Said arm is pivotally mounted at 76 and has double contacts 77 on the end thereof, formed in this instance as a single U shaped contact which is adapted to engage the fixed contacts 78 with a wiping action when the supporting arm is oscillated. Said contacts are connected to terminals 79 and 80 representing two independent circuits, the terminal 81 representing the common terminal. As the shaft 72 oscillates it will be seen that the short lever 73 exerts a substantial leverage on the longer lever 75, thereby insuring good mechanical and electrical contacts between the parts 77 and 78.

These mechanically actuated contacts may of course be substituted in several of the previously described forms of the invention and it will be understood further that many of the features shown in one form of the invention may be used in connection with those shown in one or more of the others, by making suitable changes in the relative arrangement of the parts.

I claim:

1. A circuit controlling device comprising circuit contacts, a permanent bar magnet movably mounted to open and close said contacts, a horseshoe magnet having its two ends adjacent said bar magnet, a pivotally mounted support for said horseshoe magnet, an S shaped permanent magnet mounted on the same pivot axis and a coil surrounding part of said S shaped magnet and energized at intervals to oscillate the same and hence to control said circuit contacts.

2. A circuit controlling device comprising circuit contacts, a permanent magnet movably mounted to open and close said contacts, a horseshoe magnet adjacent said permanent magnet, a pivotally mounted support for said horseshoe magnet, an S shaped permanent magnet mounted on the same pivotal axis and a coil surrounding part of said S shaped magnet, said coil being connected to said circuit contacts and energized in timed relation to the oscillations of said S shaped magnet.

3. A circuit controlling device comprising an S shaped permanent magnet mounted near its center whereby it may oscillate, each curved end span of said magnet having its ends of opposite polarity, a fixed coil of wire surrounding each of said end spans to cause such oscillations, a second magnet mounted to oscillate with said first magnet and a third magnet movably mounted to control the circuit to said coils and actuated under the influence of said second magnet.

4. A circuit controlling device comprising an S shaped permanent magnet pivotally mounted near its center whereby it may oscillate, a fixed coil of wire surrounding each end of said magnet and energized intermittently to cause such oscillations, an arm mounted to oscillate with said first magnet, a small magnet of horseshoe shape on said arm and a third magnet movably mounted to control the circuit to said coils and actuated by said horseshoe magnet.

5. A circuit controlling device comprising an S shaped permanent magnet pivotally mounted near its center whereby it may oscillate, a fixed coil of wire surrounding each end of said magnet and energized intermittently to cause such oscillations, an arm mounted to oscillate with said magnet, a small magnet on said arm, and an additional magnet movably mounted to control the circuit of said coils and actuated by said small magnet.

6. A circuit controlling device comprising an S shaped permanent magnet pivotally mounted near its center whereby it may oscillate, a fixed coil of wire surrounding said magnet near one end and energized intermittently to cause such oscillations, an arm mounted to oscillate with said magnet, a small magnet on one end of said arm, and an additional magnet influenced by said small magnet to open and close a circuit at intervals.

7. A circuit controlling device comprising an S shaped permanent magnet pivotally mounted near its center whereby it may oscillate, a fixed coil of wire surrounding said magnet near one end and energized intermittently to cause such oscillations, an arm mounted to oscillate with said magnet, a small magnet on one end of said arm, an additional magnet influenced by said small magnet to open and close a circuit at intervals, said additional magnet being mounted in a sealed container from which air has been removed and means tending to restore said S shaped magnet to normal position when said coil is deenergized.

8. In a relay, a base, a horizontal shaft thereon, an S shaped magnet on said shaft, an electromagnetic winding surrounding the upper and lower ends of said magnet, a transverse arm on said shaft and mounted to oscillate with said magnet, a curved permanent magnet at each end of said arm with unlike poles adjacent each other and projecting outwardly, a sealed contact container adjacent each pair of poles to control a circuit, stops to limit the movement of said S shaped magnet and a spring normally holding said magnet against one of said stops.

9. In a relay, a supporting base, a pivotally mounted shaft thereon, an S shaped magnet fixed to said shaft and having like poles at the ends thereof and an intermediate portion of opposite polarity, electromagnetic windings surrounding the ends of said magnet to oscillate the latter when energized intermittently, and contacts in circuit with said windings to cause said energization.

10. A circuit controlling device comprising circuit contacts, a permanent bar magnet movably mounted to open and close said contacts, a horseshoe magnet having its two ends adjacent said bar magnet, and a pivotally mounted support for said horseshoe magnet arranged substantially at right angles to said bar magnet, whereby a slight rocking movement of said support will move the two ends of said horseshoe magnet along a path nearly parallel to said bar magnet, and will change the relationship of adjacent like and unlike poles and move said bar magnet.

11. In a circuit controlling device, a supporting base, a pivotally mounted shaft thereon, an S shaped magnet on said shaft having unlike poles at the ends thereof and intermediate portions each of a polarity opposite to that of the nearest end, an electromagnetic winding surrounding an end of said magnet, between portions of opposite polarity, to oscillate said magnet, when energized intermittently, contacts in circuit with said winding, and means actuated by said magnet when oscillated, to operate said contacts and thus intermittently energize said winding.

12. A circuit controlling device comprising an S shaped permanent magnet mounted near its center whereby it may oscillate, each curved end of said magnet having its extremity of opposite polarity to the other curved end, a fixed coil of wire surrounding each of said ends to cause such oscillations, a second magnet mounted to oscillate with said first magnet and a third magnet movably mounted to control the circuit to said coils and actuated under the influence of said second magnet.

CLIFFORD V. BATES.